(12) United States Patent
Ireland et al.

(10) Patent No.: US 11,762,660 B2
(45) Date of Patent: Sep. 19, 2023

(54) VIRTUAL 3-WAY DECOUPLED PREDICTION AND FETCH

(71) Applicant: Ampere Computing LLC, Santa Clara, CA (US)

(72) Inventors: Brett Alan Ireland, Santa Clara, CA (US); Michael Stephen Chin, Santa Clara, CA (US); Stephan Jean Jourdan, Santa Clara, CA (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 16/909,352

(22) Filed: Jun. 23, 2020

(65) Prior Publication Data

US 2021/0397452 A1 Dec. 23, 2021

(51) Int. Cl.
*G06F 9/30* (2018.01)
*G06F 9/38* (2018.01)

(52) U.S. Cl.
CPC ........ *G06F 9/30181* (2013.01); *G06F 9/3802* (2013.01); *G06F 9/3804* (2013.01); *G06F 9/3846* (2013.01)

(58) Field of Classification Search
CPC .. G06F 9/30181; G06F 9/3802; G06F 9/3846; G06F 9/3804
See application file for complete search history.

(56) References Cited

U.S. PATENT DOCUMENTS

| 5,734,881 A | 3/1998 | White et al. | |
|---|---|---|---|
| 6,119,222 A * | 9/2000 | Shiell | G06F 9/3802 |
| | | | 711/E12.057 |
| 6,332,191 B1 * | 12/2001 | Witt | G06F 9/30149 |
| | | | 712/237 |
| 7,266,676 B2 * | 9/2007 | Tran | G06F 9/3804 |
| | | | 712/238 |

(Continued)

OTHER PUBLICATIONS

Reinman, G et al., "Optimizations enabled by a decoupled front-end architecture," Transactions on Computers, vol. 50, No. 4, Apr. 2001, pp. 338-355, [online], [retrieved on 2021-07-Jan. 7, 18], Retrieved from the Internet <URL: https://ieeexplore.IEEE.org/abstract/document/919279> <doi: 10.1109/12.919279>.*

(Continued)

*Primary Examiner* — Shawn Doman
(74) *Attorney, Agent, or Firm* — Withrow & Terranova, PLLC

(57) ABSTRACT

A unified queue configured to perform decoupled prediction and fetch operations, and related apparatuses, systems, methods, and computer-readable media, is disclosed. The unified queue has a plurality of entries, where each entry is configured to store information associated with at least one instruction, and where the information comprises an identifier portion, a prediction information portion, and a tag information portion. The unified queue is configured to update the prediction information portion of each entry responsive to a prediction block, and to update the tag information portion of each entry responsive to a tag and (Continued)

TLB block. The prediction information may be updated more than once, and the unified queue is configured to take corrective action where a later prediction conflicts with an earlier prediction.

18 Claims, 5 Drawing Sheets

(56) References Cited

U.S. PATENT DOCUMENTS

| | | | |
|---|---|---|---|
| 7,430,657 B2* | 9/2008 | Gat | G06F 9/3844 |
| | | | 712/240 |
| 7,493,480 B2* | 2/2009 | Emma | G06F 9/3806 |
| | | | 712/240 |
| 7,783,869 B2* | 8/2010 | Grandou | G06F 9/3844 |
| | | | 712/238 |
| 8,954,664 B1* | 2/2015 | Pruett | G06F 11/1435 |
| | | | 711/112 |
| 9,058,180 B2 | 6/2015 | Golla et al. | |
| 10,402,200 B2 | 9/2019 | Dundas et al. | |
| 10,409,763 B2 | 9/2019 | Lai et al. | |
| 2002/0174303 A1 | 11/2002 | Gelman | |
| 2004/0230780 A1* | 11/2004 | Prasky | G06F 9/3806 |
| | | | 712/238 |
| 2005/0108508 A1* | 5/2005 | Hebda | G06F 9/3822 |
| | | | 712/214 |
| 2008/0209173 A1* | 8/2008 | Evers | G06F 12/0862 |
| | | | 712/207 |
| 2011/0125986 A1* | 5/2011 | Reid | G06F 9/547 |
| | | | 712/203 |
| 2012/0290821 A1 | 11/2012 | Shah et al. | |
| 2015/0019848 A1* | 1/2015 | Bonanno | G06F 9/30047 |
| | | | 712/238 |
| 2015/0268961 A1* | 9/2015 | Zuraski | G06F 9/3804 |
| | | | 712/207 |
| 2017/0083337 A1 | 3/2017 | Burger | |
| 2019/0155608 A1* | 5/2019 | Perais | G06F 9/3806 |
| 2019/0196839 A1 | 6/2019 | Oliver et al. | |

OTHER PUBLICATIONS

International Search Report and Written Opinion for International Patent Application No. PCT/US2021/038091, dated Oct. 15, 2021, 17 pages.

* cited by examiner

VIRTUAL 3-WAY DECOUPLED PREDICTION AND FETCH

BACKGROUND

I. Field of the Disclosure

The technology of the disclosure relates generally to instruction prediction and fetching, and specifically to decoupling prediction and fetch operations in a processor.

II. Background

Accurate prefetching is an important aspect of processor performance, as it allows a processor to minimize cache misses. Instruction cache misses may be relatively expensive in terms of performance because the processor must stall until the instructions are retrieved from a longer-latency memory hierarchy. In larger workloads (for example in the server or hyperscale ecosystem), cache misses may be relatively common because code footprints are large, and in the absence of an effective prefetcher, the processor may be stalled for long periods of time, which may unacceptably compromise performance.

One conventional approach to prefetching is to tightly couple branch prediction and prefetching with the instruction cache, but in such a design, performance suffers whenever the branch predictor provides a low latency/low accuracy incorrect prediction that it must later correct using a longer latency/higher accuracy prediction. The intervening instructions that were prefetched as a result of the inaccurate prediction must be flushed and the correct instructions fetched, which wastes processor resources.

In order to mitigate the difficulties associated with tightly coupled prediction and prefetch, another approach is to decouple branch prediction and instruction fetch from each other. Decoupling branch prediction and instruction fetch allows the use of longer latency, higher bandwidth, and more accurate branch predictors, and can mask the latency between slow and fast predictions as described above. However, in such implementations, the tag and data portions of the prefetch are still coupled, and thus cache misses can still result in stalls and unacceptable performance degradation.

Further approaches may decouple the tag and data portions of the prefetch operation. However, this further decoupling may introduce extra queues between the decoupled operations, may increase the overall complexity of control flow in the processor, and may increase the number of cycles taken by the front end of the processor which increases the amount of time that mispredictions are present in the instruction stream. The longer the time that mispredictions persist in the instruction stream, the more processor cycles are wasted by proceeding down an incorrect program path, which imposes performance and power costs. Additionally, mispredictions may still involve significant costs with respect to overall performance and control complexity. Thus, a prediction and fetch implementation that can realize some of the advantages of a decoupled design while mitigating its drawbacks would be desirable.

SUMMARY OF THE DISCLOSURE

Aspects disclosed in the detailed description include a unified queue configured to perform decoupled prediction and fetch operations, and related apparatuses, systems, methods, and computer-readable media.

In this regard in one aspect, an apparatus includes a unified queue having a plurality of entries, where each entry is configured to store information associated with at least one instruction. The information comprises an identifier portion, a prediction information portion, and a tag information portion. The unified queue is configured to update the prediction information portion of each entry responsive to a prediction block, and to update the tag information portion of each entry responsive to a tag block.

In another aspect, an apparatus includes means for queueing, the means for queueing having a plurality of entries, where each entry is configured to store information associated with at least one instruction. The information comprises an identifier portion, a prediction information portion, and a tag information portion. The means for queueing is configured to update the prediction information portion of each entry responsive to a means for prediction. The means for queueing is further configured to update the tag information portion of each entry responsive to a means for providing tag information.

In yet another aspect, a method includes receiving an identifier associated with at least a first instruction at a unified queue and storing the identifier in a first entry of the unified queue. The method includes receiving a first prediction associated with the first instruction and storing the first prediction in the first entry. The method further includes receiving first tag and translation information associated with the first instruction and storing the first tag and translation information in the first entry.

In yet another aspect, a non-transitory computer-readable medium stores computer executable instructions which, when executed by a processor, cause the processor to receive an identifier associated with at least a first instruction at a unified queue and store the identifier in a first entry of the unified queue. The instructions further cause the processor to receive a first prediction associated with the first instruction and store the first prediction in the first entry, and to receive first tag and translation information associated with the first instruction and store the first tag and translation information in the first entry.

DETAILED DESCRIPTION

Figure 1:
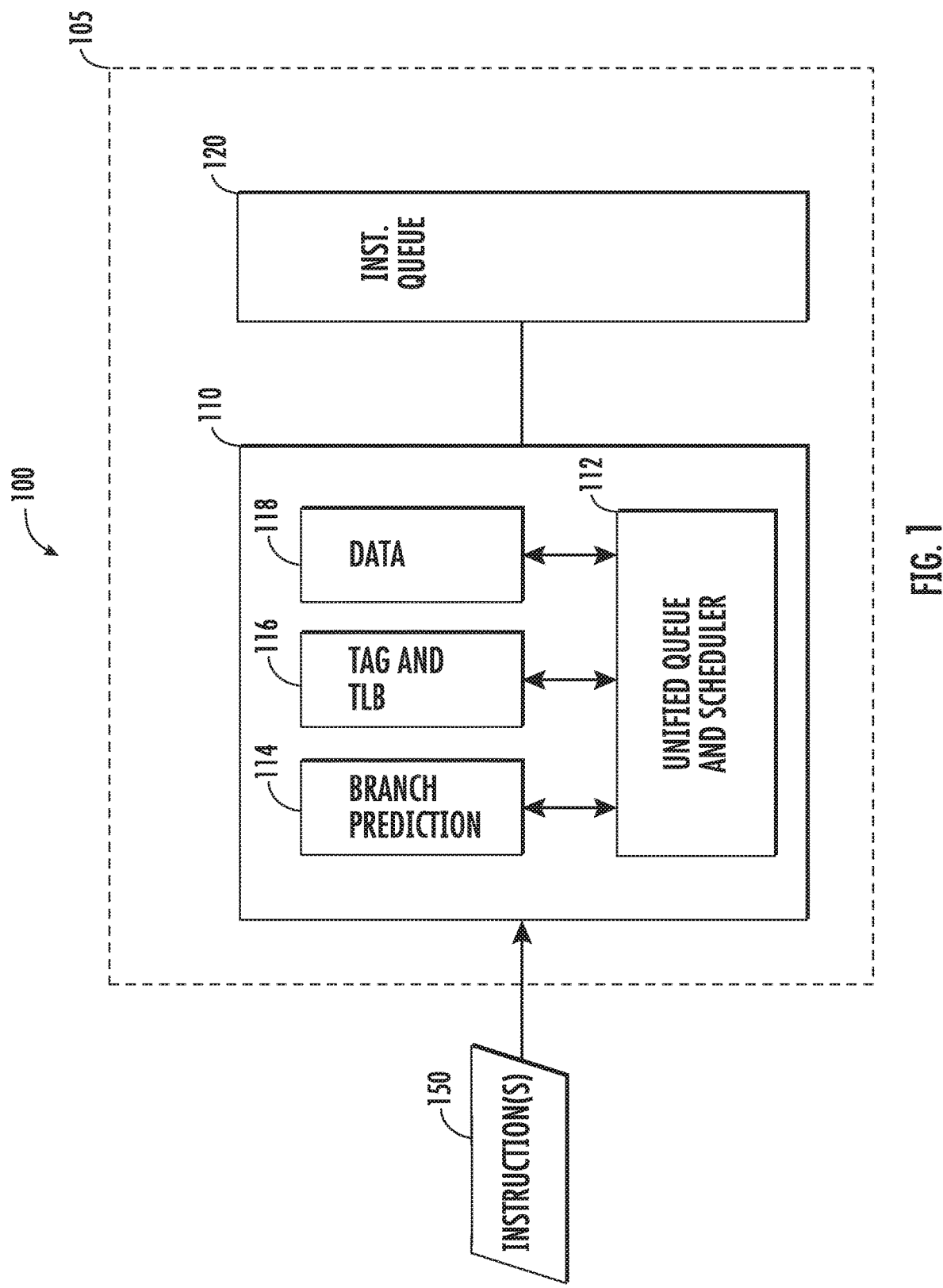
FIG. 1 is a block diagram of an exemplary processor configured to perform decoupled prediction and fetch operations.

With reference now to the drawing figures, several exemplary aspects of the present disclosure are described. The word "exemplary" is used herein to mean "serving as an example, instance, or illustration." Any aspect described herein as "exemplary" is not necessarily to be construed as preferred or advantageous over other aspects.

Aspects disclosed in the detailed description include a unified queue configured to perform decoupled prediction and fetch operations, and related apparatuses, systems, methods, and computer-readable media.

In this regard in one aspect, an apparatus includes a unified queue having a plurality of entries, where each entry is configured to store information associated with at least one instruction. The information comprises an identifier portion, a prediction information portion, and a tag information portion. The unified queue is configured to update the prediction information portion of each entry responsive to a prediction block, and to update the tag information portion of each entry responsive to a tag block.

In another aspect, an apparatus includes means for queueing, the means for queueing having a plurality of entries, where each entry is configured to store information associated with at least one instruction. The information comprises an identifier portion, a prediction information portion, and a tag information portion. The means for queueing is configured to update the prediction information portion of each entry responsive to a means for prediction. The means for queueing is further configured to update the tag information portion of each entry responsive to a means for providing tag information.

In yet another aspect, a method includes receiving an identifier associated with at least a first instruction at a unified queue and storing the identifier in a first entry of the unified queue. The method includes receiving a first prediction associated with the first instruction and storing the first prediction in the first entry. The method further includes receiving first tag and translation information associated with the first instruction and storing the first tag and translation information in the first entry.

In yet another aspect, a non-transitory computer-readable medium stores computer executable instructions which, when executed by a processor, cause the processor to receive an identifier associated with at least a first instruction at a unified queue and store the identifier in a first entry of the unified queue. The instructions further cause the processor to receive a first prediction associated with the first instruction and store the first prediction in the first entry, and to receive first tag and translation information associated with the first instruction and store the first tag and translation information in the first entry.

In this regard, FIG. 1 is a block diagram 100 of an exemplary processor 105 configured to perform decoupled prediction and fetch operations. The processor 105 may request and/or receive instruction(s) 150 based on locations or addresses of the instruction(s) 150 from an instruction source (e.g., an instruction cache, a higher-level cache, or a memory, as non-limiting examples). Information associated with the instruction(s) 150 (such as locations or addresses of the instruction(s) 150, which may include virtual addresses associated with groups or lines of instruction(s) 150) are received at an instruction fetch block 110, which may perform decoupled prediction and fetch operations associated with the instruction(s) 150, as will be described further herein. Once the instruction fetch block 110 has completed the decoupled prediction and fetch operations associated with the instruction(s) 150 and the instruction(s) 150 are ready to be queued, the instruction fetch block 110 may provide the instruction(s) 150 to an instruction queue 120. The instruction queue 120 may initiate further processing of the instruction(s) 150 by other portions of the processor 105 (not illustrated).

In order to perform decoupled prediction and fetch operations in the instruction fetch block 110, the instruction fetch block 110 comprises a unified queue and scheduler 112, which is configured to independently store and update both prediction and tag information in a plurality of entries, where each of the entries is associated with an instruction identifier. The instruction identifier may be associated with a single instruction or a plurality of instructions (such as a fetch group, instruction cache line, or the like), and in one aspect may be an address associated with those instruction(s) (e.g., a virtual address or physical address). In order to provide and/or update the prediction and tag information for each entry, the unified queue and scheduler 112 is coupled to a branch prediction block 114 and a tag and translation lookaside buffer (TLB) block 116.

The branch prediction block 114 may provide one or more levels of branch prediction. In the case of multiple levels of branch prediction, the levels may have differing accuracies and latencies, and thus each entry of the unified queue and scheduler 112 may be updated based on prediction information from the one or more levels of branch prediction (e.g., a shorter latency but less accurate predictor, and a longer latency but more accurate predictor). As will be discussed later on, in the case of a longer latency (but potentially more accurate) prediction conflicting with a relatively faster (but potentially less accurate) prediction, the unified queue and scheduler 112 may be configured to flush entries newer than the entry that received the conflicting prediction in response to the longer latency prediction. Access to the branch prediction block 114 for an entry may be initiated when the entry is first populated (e.g., when the entry is associated with the instruction(s) 150), or if the branch prediction block 114 is not available (e.g., because of a stall), it may be delayed until the branch prediction block 114 becomes available.

The tag and TLB block 116 may provide tag and translation information (e.g., address translation, tag array lookup and matching, and hit or miss information, as non-limiting examples) for the one or more instructions associated with an instruction identifier stored in an entry of the unified queue and scheduler 112, which may be stored in the entry as tag information. Access to the tag and TLB block 116 for an entry may be initiated at the same time that the entry is sent for prediction by the branch prediction block 114 (but not before or if the tag and TLB block 116 is not available (e.g., because of a stall), access to the tag and TLB block 116 may be delayed until the tag and TLB block 116 becomes available.

The instruction fetch block 110 further comprises a data access block 118 coupled to the unified queue and scheduler 112. The data access block 118 is configured to perform any required data accesses and/or to retrieve the instruction(s) associated with an entry of the unified queue and scheduler 112. In one aspect, such data accesses may be initiated after tag and translation operations for the entry have been completed. In another aspect, such data accesses may be initiated at least in part in parallel (i.e., may be initiated contemporaneously with address translation, or may be initiated after address translation has been initiated but before the entry has been updated with the results of address translation) with address translation operations for the entry. However, such data accesses may not be initialed before tag and translation operations have been initiated.

In one aspect, where the processor 105 processes the instruction(s) 150 in-order in the instruction fetch block 110, the unified queue and scheduler 112 may be configured as a circular buffer, as will be discussed in greater detail with respect to FIG. 3. This may allow the unified queue and scheduler 112 to track which entries of the unified queue and scheduler 112 are available to receive new instruction(s), which have been sent for branch prediction, which have had address translation requested, and which have had data access requested. However, other aspects where the processor 105 may process the instruction(s) 150 out-of-order in the instruction fetch block 110 are also feasible (e.g., the unified queue and scheduler 112 may store tracking information in each entry, and the tracking information may indicate which entries are available, ready for prediction, ready for translation, and ready for data access), and are within the scope of the teachings of the present disclosure.

Figure 2:
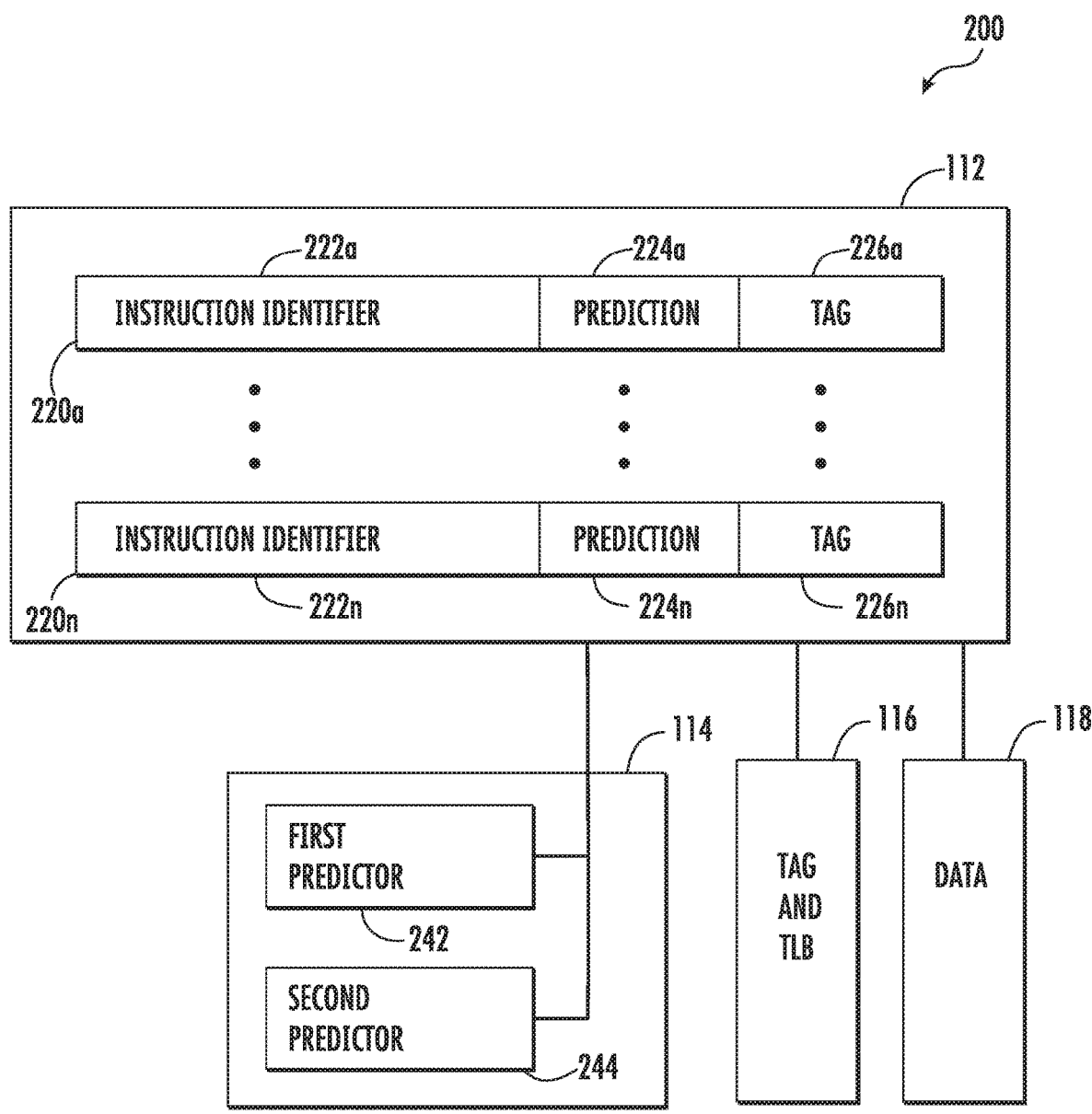
FIG. 2 is a detailed block diagram illustrating an exemplary instruction fetch block supporting decoupled prediction and fetch operations.

FIG. 2 is a detailed block diagram 200 illustrating an exemplary instruction fetch block supporting decoupled prediction and fetch operations. The exemplary instruction fetch block may be the unified queue and scheduler 112 of FIG. 1. As discussed with respect to FIG. 1, the unified queue and scheduler 112 comprises a plurality of entries 220a-220n. Each of the entries 220a-220n comprises an instruction identifier portion 222a-222n, a prediction information portion 224a-224n, and a tag information portion 226a-226n.

Each instruction identifier portion 222a-222n stores information that identifies an instruction or plurality of instructions for which prediction and tag information will be requested by the unified queue and scheduler 112. As discussed above, in one aspect the instruction identifier portion 222 may be a virtual address corresponding to a cache line of instructions (such as the instructions 150 of FIG. 1). The instruction identifier portion 222a-222n of an entry is populated when new instruction(s) are received by the unified queue and scheduler 112 and are associated with the entry, and remains constant until the instruction(s) corresponding to that entry are sent to the instruction queue 120, or the entry is invalidated (either due to a reset event, or to a change in expected program direction of a relatively older entry in the unified queue and scheduler 112).

Each prediction information portion 224a-224n stores information regarding the expected program direction (i.e., which instruction or cache lines are expected to be executed after those stored in a particular entry 220a-220n). This prediction information may be set and updated one or more times in response to the branch prediction block 114. The branch prediction block 114 may comprise a first predictor 242 and a second predictor 244. The first predictor 242 may provide a prediction after a first latency (i.e., a first number of clock cycles), and the second predictor 244 may provide a prediction after a second latency (i.e., a second number of clock cycles). In one aspect, the second latency may be longer than the first latency. Thus, an entry may have its prediction information portion 224a-224n initially populated by a prediction from the first predictor 242. At a later time, the entry may have its prediction information portion 224a-224n updated in response to a prediction from the second predictor 244.

If the prediction from the second predictor 244 matches the prediction from the first predictor 242, the existing contents of the associated prediction information portion 224a-224n may be retained, and the unified queue and scheduler 112 may continue with normal operation. However, if the prediction from the second predictor 244 is different from the prediction from the first predictor 242, the unified queue and scheduler 112 may need to take corrective action based on the updated prediction from the second predictor 244. In one aspect, the corrective action may involve invalidating all of the entries of the unified queue and scheduler 112 that are relatively newer than the entry that received the updated prediction information from the second predictor 244. As will be discussed below with respect to FIG. 3, where the unified queue and scheduler 112 is implemented as a circular buffer, determining which entries are relatively newer than the entry that received the updated prediction information from the second predictor 244 may involve evaluating the state of a plurality of pointers associated with the unified queue and scheduler 112. Alternatively, the unified queue and scheduler 112 may store relative age information in each entry 220a-220n of the unified queue and scheduler 112, and may examine that information in order to determine which entries should be invalidated in response to the updated prediction from the second predictor 244.

Although the branch prediction block 114 has been illustrated with a first predictor 242 and a second predictor 244, this is merely for purposes of example and not by way of limitation, and those having skill in the art will recognize that more or fewer predictors may be used without departing from the scope of the teachings of the present disclosure. Other implementations of the branch prediction block 114 may employ only one predictor (in which case it may not be necessary to perform invalidations in response to updated predictions, as described above), or may employ more than two predictors (in which case more than one invalidation may be performed, if a second prediction is different from a first prediction, and if a third prediction is different from the second prediction or the first prediction).

Each tag information portion 226a-226n stores address translation information related to instruction(s) associated with the instruction identifier portion 222a-222n for each entry. The tag information portion 226a-226n of each entry 220a-220n may be populated by accessing the tag and TLB block 116 for the entry 220a-220n, which may be initiated at the same time that the entry is sent for prediction by the branch prediction block 114 (but not before). The tag and TLB block 116 will provide tag and translation information back to the unified queue and scheduler 112, which will write the tag and translation information into the entry associated with the tag and translation access request. As will be discussed further with reference to FIG. 3, where an entry receives a conflicting branch prediction, any entries that are relatively newer may be invalidated. This may include entries for which tag and translation access has been requested or completed. In that case, the tag and translation access for those entries may be terminated, and any tag information that has been written into the newer entries will be treated as invalid.

Figure 3:
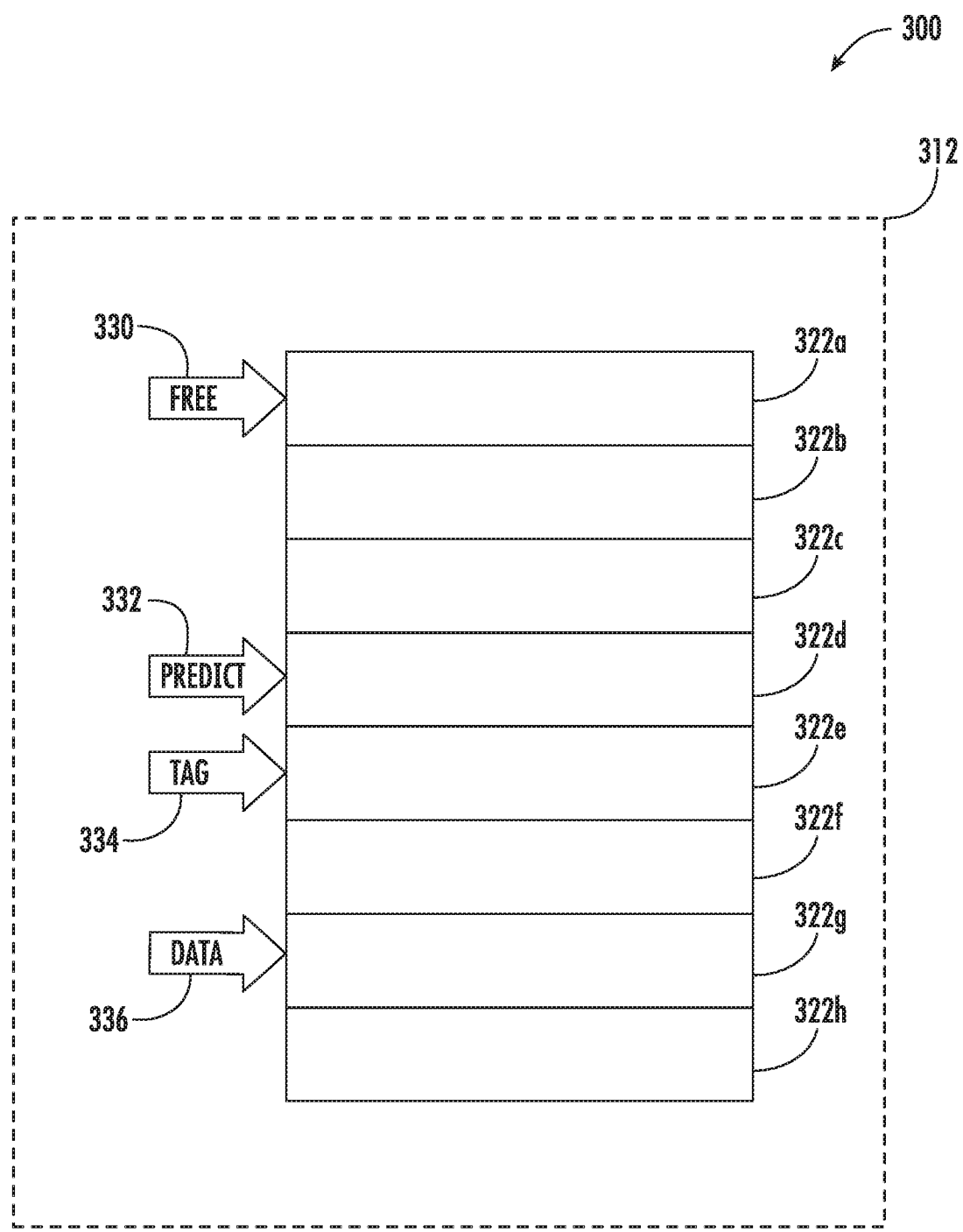
FIG. 3 is a block diagram illustrating an implementation of an exemplary instruction fetch block configured as a circular buffer.

In this regard, FIG. 3 is a block diagram 300 illustrating an implementation of an exemplary unified queue and scheduler 312 configured as a circular buffer. In one aspect, the unified queue and scheduler 312 may correspond to the unified queue and scheduler 112 of FIGS. 1 and 2. The unified queue and scheduler 312 is comprised of a plurality of entries 322a-322h, which may store identifier, prediction, and tag information as described above with reference to FIGS. 1 and 2. Although the unified queue and scheduler 312 has been shown as having 8 entries 322a-322h, this is merely for purposes of illustration and not by way of limitation, and those having skill in the art will realize that the teachings of the present disclosure apply to unified queues having differing numbers of entries.

The unified queue and scheduler 312 may be implemented as a circular buffer, and thus further comprises a plurality of pointers to allow the unified queue and scheduler 312 to track the status of entries 322a-322h. The plurality of pointers include a free pointer 330 (which tracks which entry is next to be de-allocated), a prediction pointer 332 (which tracks the next entry to be sent for branch prediction), a tag and translation pointer 334 (which tracks the next entry to be sent for tag and translation), and a data pointer 336 (which tracks the next entry to be sent for data access). As will be understood by those in the part, the implementation of the unified queue and scheduler 312 as a circular buffer means that entry 322h effectively is adjacent to both entry 322g and 322a, such that the next entry after 322h is 322g, and the previous entry before 322h is 322a.

When new instructions arrive at the unified queue and scheduler 312 (such as the instruction(s) 150 of FIG. 1, for example), the entry 322a-322h at which the free pointer 330 is pointing is checked for availability—in the illustrated aspect, this is entry 322a. In one aspect, determining if the entry 322a is available is done by comparing the free pointer 330 to the prediction pointer 332. If the prediction pointer 332 is not pointing to the next entry after to the free pointer 330, this indicates that the entry pointed to by the free pointer 330 is available. If entry 322a is available (i.e., is not currently occupied by previous instruction(s) that have not yet completed prediction, tag, and data access), then the new instructions may be allocated to the entry 322a. If entry 322a is not available (i.e., it is currently occupied by previous instruction(s) that have not yet completed prediction, tag, or data access), then the unified queue and scheduler 312 may stall until the entry 322a becomes available to accept new instruction(s). If and when the new instruction(s) are allocated to the entry 322a, this may include writing an identifier of the new instruction(s) into an identifier portion of the entry 322a.

The free pointer 330 may be updated to point to a next entry (in this case, entry 322h), when all operations associated with the entry to which it is currently pointing (in this case, entry 322a) have been completed. In one aspect, when tag and data access have been completed for entry 322a, the free pointer 330 may be updated to point at entry 322h. For example, the instruction(s) associated with entry 322a may be sent to an instruction decode block (not illustrated), and in response the instruction decode block may provide a token back to the unified queue and scheduler 112 to indicate that all operations associated with entry 322h have been completed.

The prediction pointer 332 indicates a next entry that is available to be sent for prediction, for example at the prediction block 114. When the entry at which the prediction pointer 332 is currently pointing is sent for prediction, the prediction pointer 332 is moved to the next entry. Thus, in the illustrated example, the prediction pointer 332 is pointing to entry 322d. When entry 322d is sent for prediction, the prediction pointer is updated to point at entry 322c. As discussed above, if a relatively older entry 322a-322h receives a conflicting prediction, all of the newer entries may be invalidated, and in this case, the prediction pointer 322 may be set to point to the entry that received the conflicting prediction, and normal operation resumed.

The tag and translation pointer 334 indicates a next entry that is available to be sent for tag and translation access, for example at the tag and TLB block 116. When the entry at which the tag and translation pointer 334 is currently pointing is sent for tag and translation access, the tag and translation pointer 334 is moved to the next entry. Thus, in the illustrated example, the tag and translation pointer 334 is pointing to entry 322e. When entry 322e is sent for tag and translation access, the tag and translation pointer 334 is updated to point at entry 322d. As discussed above, if a relatively older entry 322a-322h receives a conflicting prediction, all of the newer entries may be invalidated, and in this case, the tag and translation pointer 334 may be set to point to the entry that received the conflicting prediction, and normal operation resumed.

Likewise, the data pointer 336 indicates a next entry that is available to be sent to data access, for example at the data block 118. When the entry at which the data pointer 336 is currently pointing is sent for data access, the data pointer 336 is moved to the next entry. Thus, in the illustrated example, the data pointer is pointing to entry 322g. When entry 322g is sent for data access, the data pointer 336 is updated to point at entry 322f. As discussed above, if a relatively older entry 322a-322h receives a conflicting prediction, all of the newer entries may be invalidated, and in this case, the data pointer 336 may be set to point to the entry that received the conflicting prediction, and normal operation resumed. Additionally, since tag and translation access and data access may have differing latencies but do not depend directly on each other, in some aspects, instead of waiting for tag and translation access to be complete before initiating data access, data access may be initiated at the same time as tag and translation access, or when the data pointer 336 is within a particular number of entries of the tag and translation pointer 334 (where the data pointer 336 is less than three entries away from the tag and translation pointer, for example). Initiating data access while tag and translation access is still ongoing may improve overall processor performance in some aspects.

Figure 4:
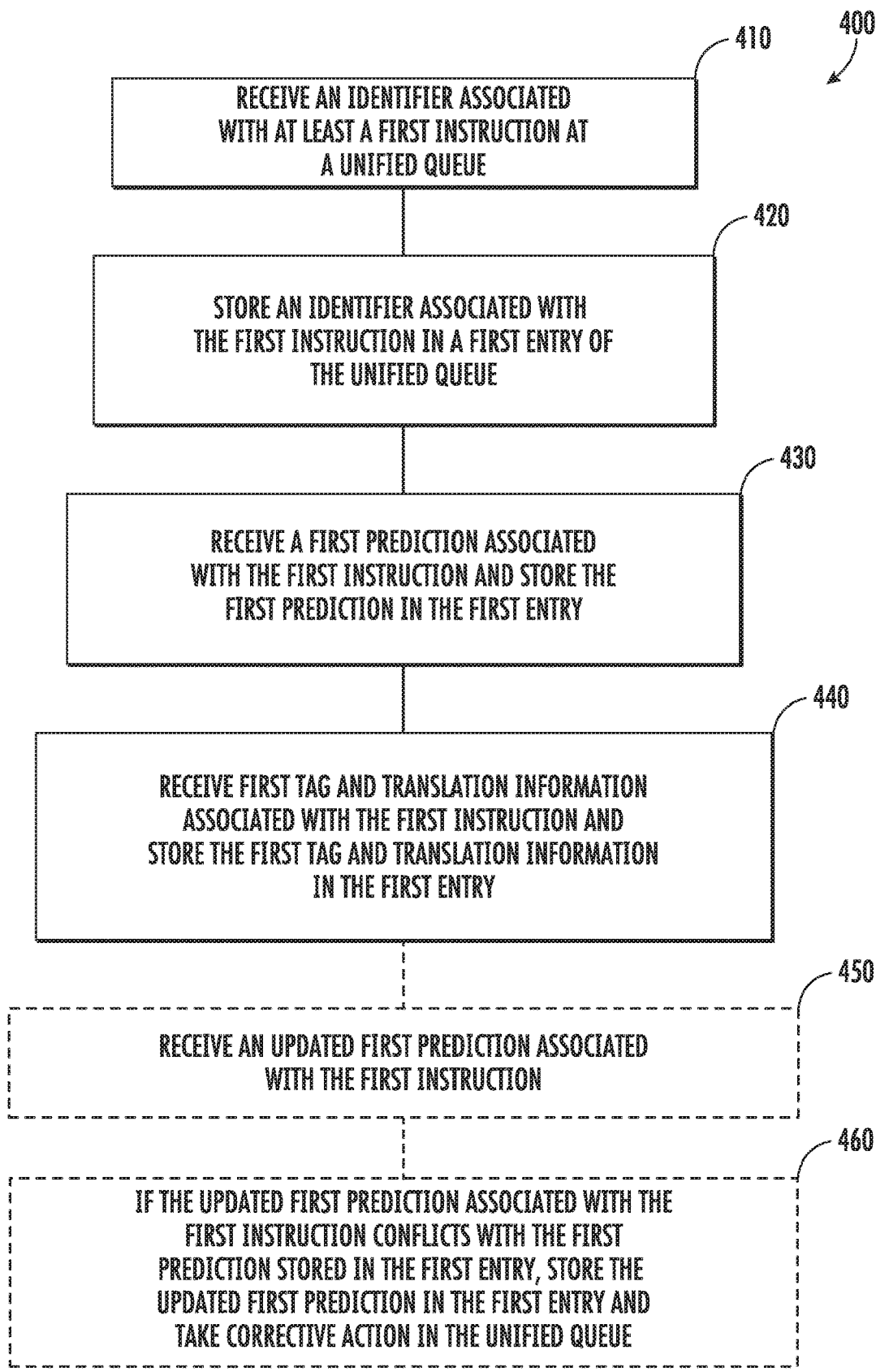
FIG. 4 is a flowchart illustrating a method of performing decoupled prediction and fetch operations.

FIG. 4 is a flowchart illustrating a method 400 of performing decoupled prediction and fetch operations. In some aspects, the method 400 may be performed by the apparatuses discussed above with respect to FIGS. 1-3. The method 400 begins at block 410, where at least a first instruction is received at a unified queue. As discussed with reference to FIGS. 1-3, the queue may receive a single instruction or a plurality of instructions at a time. The method 400 continues at block 420, where an identifier associated with the first instruction is stored in a first entry of the unified queue. For example, as discussed with reference to FIGS. 1-3, in one aspect, the unified queue may receive a cache line of instructions, and may store a virtual address associated with that cache line of instructions in an identifier portion of the first entry of the unified queue.

The method continues at block 430, where a first prediction associated with the first instruction is received at the unified queue, and is stored in the first entry. As discussed with reference to FIGS. 1-3, the first prediction may be stored in a prediction portion of the first entry. The method continues at block 440, where first tag and translation information associated with the first instruction is received at the unified queue, and is stored in the first entry. As discussed with reference to FIGS. 1-3, the tag and translation information may be stored in a tag and translation portion of the first entry.

The method may further continue at block 450, where an updated first prediction associated with the first instruction is received. As discussed with reference to FIGS. 1-3, this may be a branch prediction from a second branch predictor having a longer latency relative to a first branch predictor. The method may further continue at block 460 where, if the updated first prediction associated with the first instruction conflicts with the first prediction stored in the first entry, storing the updated first prediction in the first entry (i.e., replacing the first prediction in the first entry with the updated first prediction) and taking corrective action in the unified queue. As discussed with reference to FIGS. 1-3, this may include over-writing the prediction information portion of the first entry with the updated first prediction from the second branch predictor, invalidating all entries that are relatively newer than the first entry, and updating the free pointer, prediction pointer, tag pointer, and data pointer accordingly.

Those having skill in the art will recognize that although certain exemplary aspects have been discussed above, the teachings of the present disclosure apply to other aspects. For example, although the above aspects have discussed particular numbers of entries of the unified queue and scheduler, the teachings of the present disclosure would apply to unified queues having differing numbers of entries. While the unified queue has been discussed with respect to specific aspects, such as implementation as a circular buffer with pointers, or alternatively by tracking age information in individual entries of the unified queue, those having skill in the art will recognize that other data structures may be adapted for this purpose, as long as they are capable of tracking the tag, prediction, and data access of their entries as described herein. All such data structures are specifically within the scope of the teachings of the present disclosure, and may be referred to as means for queueing. Likewise, various combinations of numbers and latencies of predictions blocks have been discussed, but other combinations are similarly within the scope of the teachings of the present disclosure, and may be referred to as means for predicting. Similarly, although illustrated aspects have disclosed tag and translation information coming from a single tag and TLB block, other aspects may distribute tag and address translation access across a number of blocks that nevertheless perform similar functions to the single tag and TLB block of the present disclosure. All these aspects are within the scope of the teachings of the present disclosure, and may be referred to as means for providing tag information. Additionally, specific functions have been discussed in the context of specific hardware blocks, but the assignment of those functions to those blocks is merely exemplary, and the functions discussed may be incorporated into other hardware blocks without departing from the teachings of the present disclosure.

The portion of an exemplary processor supporting decoupled prediction and fetch operations according to aspects disclosed herein may be provided in or integrated into any processor-based device. Examples, without limitation, include a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP) phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

Figure 5:
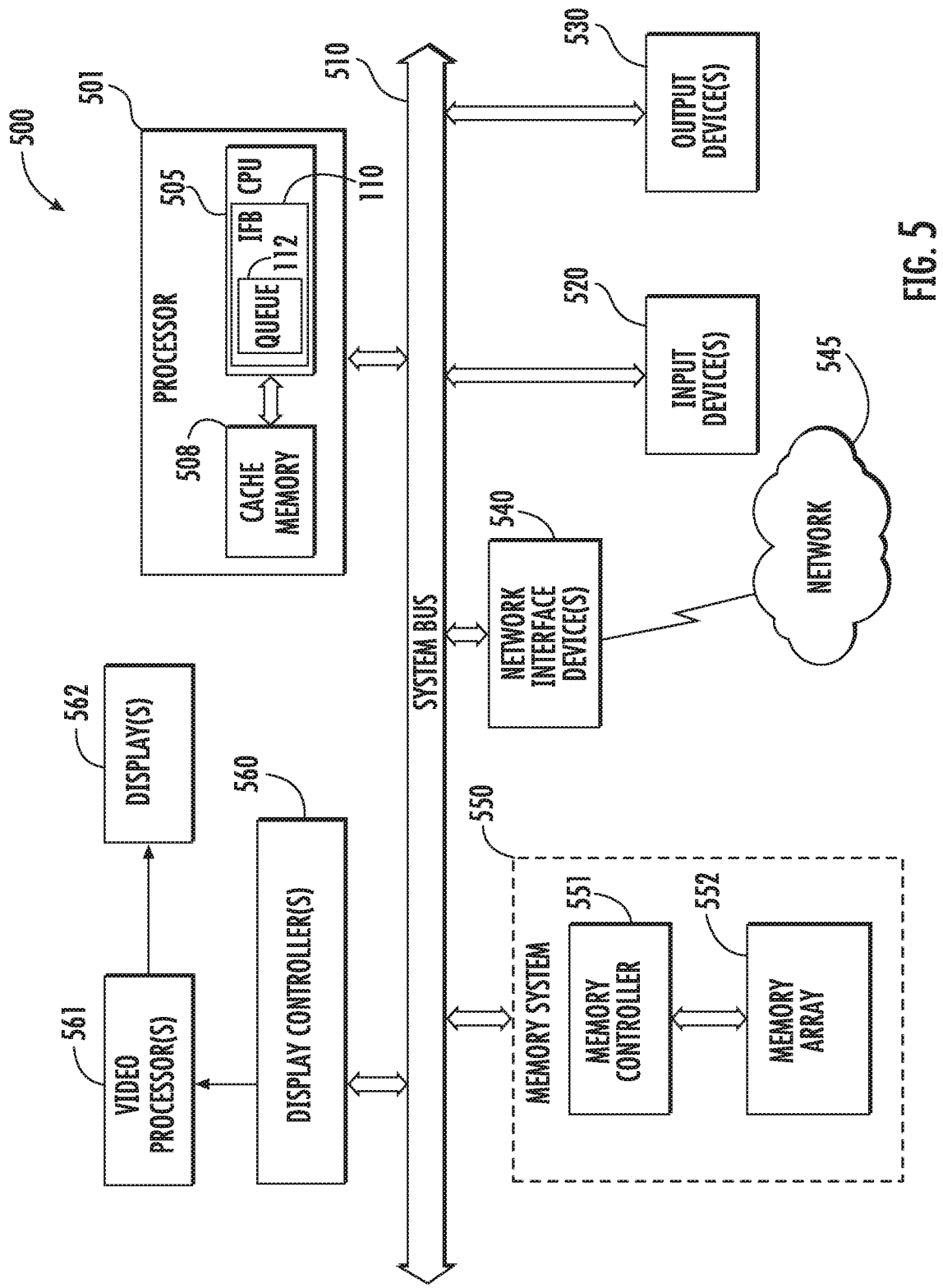
FIG. 5 is a block diagram of an exemplary processor-based system configured to perform decoupled prediction and fetch operations.

In this regard, FIG. 5 illustrates an example of a processor-based system 500 that can support or perform decoupled prediction and fetch operations illustrated and described with respect to FIGS. 1-4. In this example, the processor-based system 500 includes a processor 501 having one or more central processing units (CPUs) 505, each including one or more processor cores, and which may correspond to the processor 105 of FIG. 1, and as such may include the instruction fetch block 110 having the unified queue and scheduler 112 of FIG. 1. The CPU(s) 505 may be a master device. The CPU(s) 505 may have cache memory 508 coupled to the CPU(s) 505 for rapid access to temporarily stored data. The CPU(s) 505 is coupled to a system bus 510 and can intercouple master and slave devices included in the processor-based system 500. As is well known, the CPU(s) 505 communicates with these other devices by exchanging address, control, and data information over the system bus 510. For example, the CPU(s) 505 can communicate bus transaction requests to a memory controller 551 as an example of a slave device. Although not illustrated in FIG. 5, multiple system buses 510 could be provided, wherein each system bus 510 constitutes a different fabric.

Other master and slave devices can be connected to the system bus 510. As illustrated in FIG. 5, these devices can include a memory system 550, one or more input devices 520, one or more output devices 530, one or more network interface devices 540, and one or more display controllers 560, as examples. The input device(s) 530 can include any type of input device, including, but not limited to, input keys, switches, voice processors, etc. The output device(s) 520 can include any type of output device, including, but not limited to, audio, video, other visual indicators, etc. The network interface device(s) 540 can be any devices configured to allow exchange of data to and from a network 545. The network 545 can be any type of network, including, but not limited to, a wired or wireless network, a private or public network, a local area network (LAN), a wireless local area network (WLAN), a wide area network (WAN), a BLUETOOTH™ network, and the Internet. The network interface device(s) 540 can be configured to support any type of communications protocol desired. The memory system 550 can include the memory controller 551 coupled to one or more memory units 552.

The CPU(s) 505 may also be configured to access the display controller(s) 560 over the system bus 510 to control information sent to one or more displays 562. The display controller(s) 560 sends information to the display(s) 562 to be displayed via one or more video processors 561, which process the information to be displayed into a format suitable for the display(s) 562. The display(s) 562 can include any type of display, including, but not limited to, a cathode ray tube (CRT), a liquid crystal display (LCD), a plasma display, a light emitting diode (LED) display, etc.

Those of skill in the art will further appreciate that the various illustrative logical blocks, modules, circuits, and algorithms described in connection with the aspects disclosed herein may be implemented as electronic hardware, instructions stored in memory or in another computer readable medium and executed by a processor or other processing device, or combinations of both. The master devices and slave devices described herein may be employed in any circuit, hardware component, integrated circuit (IC), or IC chip, as examples. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium known in the art. An exemplary storage medium is coupled to the processor such that the processor can read information from, and write information to, the storage medium. In the alternative, the storage medium may be integral to the processor. The processor and the storage medium may reside in an ASIC. The ASIC may reside in a remote station. In the alternative, the processor and the storage medium may reside as discrete components in a remote station, base station, or server.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations. Thus, the disclosure is not intended to be limited to the examples and designs described herein, but is to be accorded the widest scope consistent with the principles and novel features disclosed herein.

What is claimed is:

1. An apparatus, comprising:
    a unified queue having a plurality of entries, each entry configured to store information associated with at least one instruction, the information comprising an identifier portion, a prediction information portion, and a tag information portion corresponding to the at least one instruction associated with the instruction identifier portion; and
    the unified queue configured to:
        update the prediction information portion of each entry responsive to a prediction block by being configured to:
            receive first prediction information associated with a first entry from the prediction block; and
            store the first prediction information in the prediction information portion of the first entry; and
        update the tag information portion of each entry responsive to a tag and TLB block by being configured to request that the tag and TLB block provide first tag information associated with the first entry in response to storing the first prediction information in the prediction information portion of the first entry.

2. The apparatus of claim 1, wherein the unified queue is configured to allocate the first entry by storing an identifier associated with the at least one instruction in the identifier portion of the first entry.

3. The apparatus of claim 1, wherein the first prediction information is received from a first predictor having a first latency.

4. The apparatus of claim 1, wherein:
    the unified queue is configured to allocate a second entry by storing an identifier associated with at least one instruction in the identifier portion of the second entry; and
    the unified queue is further configured to receive updated first prediction information associated with the first entry from the prediction block, store the updated first prediction information in the prediction information portion of the first entry, and invalidate the second entry based on the updated first prediction information.

5. The apparatus of claim 4, wherein the updated first prediction information is received from a second predictor, the second predictor having a second latency longer than the first latency.

6. The apparatus of claim 1, wherein the unified queue is configured to receive the first tag information from the tag and TLB block and store the first tag information in the tag information portion of the first entry.

7. The apparatus of claim 6, wherein the unified queue is configured to request that a data access block retrieve at least one instruction associated with the first entry in response to storing the first tag information in the tag information portion of the first entry.

8. The apparatus of claim 1, where in the unified queue is configured to request that a data access block retrieve at least one instruction associated with the first entry in response to storing the first prediction information in the prediction information portion of the first entry.

9. The apparatus of claim 1, wherein the unified queue is configured as a circular buffer, and wherein the unified queue further comprises a free pointer, a prediction pointer, a tag pointer, and a data pointer.

10. The apparatus of claim 1, integrated into an integrated circuit (IC).

11. The apparatus of claim 10, further integrated into a device selected from the group consisting of: a server, a computer, a portable computer, a desktop computer, a mobile computing device, a set top box, an entertainment unit, a navigation device, a communications device, a fixed location data unit, a mobile location data unit, a global positioning system (GPS) device, a mobile phone, a cellular phone, a smart phone, a session initiation protocol (SIP)

phone, a tablet, a phablet, a wearable computing device (e.g., a smart watch, a health or fitness tracker, eyewear, etc.), a personal digital assistant (PDA), a monitor, a computer monitor, a television, a tuner, a radio, a satellite radio, a music player, a digital music player, a portable music player, a digital video player, a video player, a digital video disc (DVD) player, a portable digital video player, an automobile, a vehicle component, avionics systems, a drone, and a multicopter.

12. An apparatus, comprising:
a means for queueing, the means for queueing having a plurality of entries, each entry configured to store information associated with at least one instruction, the information comprising an identifier portion, a prediction information portion, and a tag information portion corresponding to the at least one instruction associated with the instruction identifier portion;
the means for queueing configured to update the prediction information portion of each entry responsive to a means for prediction by being configured to:
receive first prediction information associated with a first entry from the means for prediction; and
store the first prediction information in the prediction information portion of the first entry; and
the means for queueing further configured to update the tag information portion of each entry responsive to a means for providing tag information by being configured to request that the means for providing tag information provide first tag information associated with the first entry in response to storing the first prediction information in the prediction information portion of the first entry.

13. A method, comprising:
receiving an instruction identifier associated with a first instruction at a unified queue;
storing the instruction identifier in a first entry of the unified queue;
receiving a first prediction associated with the first instruction;
storing the first prediction in the first entry;
requesting that a tag and TLB block provide first tag information associated with the first entry in response to storing the first prediction in the first entry;
receiving the first tag and translation information associated with the first instruction; and
storing the first tag and translation information in the first entry.

14. The method of claim 13, further comprising receiving an updated first prediction associated with the first instruction.

15. The method of claim 13, wherein the first prediction is received from a first predictor having a first latency, the updated first prediction is received from a second predictor having a second latency, and wherein the second latency is longer than the first latency.

16. The method of claim 14, further comprising:
replacing the first prediction with the updated first prediction in the first entry and taking corrective action in the unified queue, in response to the updated first prediction associated with the first instruction conflicting with the first prediction stored in the first entry; and
retaining the first prediction in the first entry, in response to the updated first prediction associated with the first instruction not conflicting with the first prediction stored in the first entry.

17. The method of claim 16, wherein the corrective action comprises invalidating all entries of the unified queue that are newer than the first entry which received the updated first prediction.

18. A non-transitory computer-readable medium having stored thereon computer executable instructions which, when executed by a processor, cause the processor to:
receive an instruction identifier associated with a first instruction at a unified queue;
store the instruction identifier in a first entry of the unified queue;
receive a first prediction associated with the first instruction;
store the first prediction in the first entry;
request that a tag and TLB block provide first tag information associated with the first entry in response to storing the first prediction in the first entry;
receive the first tag and translation information associated with the first instruction; and
store the first tag and translation information in the first entry.

* * * * *